(12) United States Patent
Swartz

(10) Patent No.: US 12,042,826 B1
(45) Date of Patent: Jul. 23, 2024

(54) 3D PRINTER EXTRUDER CLEANING PAD

(71) Applicant: Mitchell Robert Swartz, Weston, MA (US)

(72) Inventor: Mitchell Robert Swartz, Weston, MA (US)

(*) Notice: Subject to any disclaimer, the term of this patent is extended or adjusted under 35 U.S.C. 154(b) by 905 days.

(21) Appl. No.: 16/602,864

(22) Filed: Dec. 12, 2019

(51) Int. Cl.
B08B 1/00 (2006.01)
B29C 64/35 (2017.01)
B32B 3/26 (2006.01)
B32B 5/02 (2006.01)
B32B 5/26 (2006.01)
B32B 7/09 (2019.01)
B32B 7/12 (2006.01)
B33Y 40/00 (2020.01)
D04H 13/00 (2006.01)
B29C 64/118 (2017.01)

(52) U.S. Cl.
CPC ............. B08B 1/001 (2013.01); B29C 64/35 (2017.08); B32B 3/266 (2013.01); B32B 5/022 (2013.01); B32B 5/26 (2013.01); B32B 7/09 (2019.01); B32B 7/12 (2013.01); B33Y 40/00 (2014.12); D04H 13/00 (2013.01); B29C 64/118 (2017.08); B32B 2250/04 (2013.01); B32B 2262/02 (2013.01); B32B 2262/062 (2013.01); B32B 2307/304 (2013.01); D10B 2201/02 (2013.01); D10B 2401/022 (2013.01); D10B 2401/12 (2013.01)

(58) Field of Classification Search
CPC ........... B08B 1/001; B32B 5/022; B32B 5/26; B32B 2250/04; B29C 64/35; B33Y 40/00
See application file for complete search history.

(56) References Cited

U.S. PATENT DOCUMENTS

| | | | | |
|---|---|---|---|---|
| 3,785,102 A | * | 1/1974 | Amos | A47L 23/266 52/309.3 |
| 3,984,601 A | * | 10/1976 | Blickenstaff | D01F 6/38 428/394 |
| 6,308,368 B1 | * | 10/2001 | Tone | A47L 11/4038 15/230 |
| 7,694,379 B2 | * | 4/2010 | Glaug | A47L 13/20 15/228 |
| 2008/0086834 A1 | * | 4/2008 | Schwarz | A47L 5/24 15/344 |
| 2010/0330859 A1 | * | 12/2010 | Soula | B29C 70/083 29/428 |
| 2013/0319463 A1 | * | 12/2013 | Policicchio | A47L 13/225 134/6 |
| 2019/0077661 A1 | * | 3/2019 | Erb | C09K 23/16 |
| 2019/0183305 A1 | * | 6/2019 | Lawson Mclean | A47L 5/24 |

* cited by examiner

Primary Examiner — Joanna Pleszczynska

(57) ABSTRACT

In accordance with a preferred embodiment of the invention, there is disclosed an article of manufacture for cleaning the external surface of a 3D printer's extruder comprising: A filament adherent surface capable of removing unwanted material and providing samples of post-extruder filament material for examination, an oil absorbing volume capable of removing and storing for disposal oils and other hydrophobic fluid materials unintentionally or inadvertently on the external extruder surface, a thermal insulating layer to protect the hand cleaning the external extruder volume, a cowoven material for improving structural strength, and a perimeter edge modification to improve material removal.

19 Claims, 2 Drawing Sheets

3D PRINTER EXTRUDER CLEANING PAD

FIELD OF THE INVENTION

This invention relates generally to the field of 3D printers and more specifically to an article of manufacture for wiping clean the external surface of a 3D printer's extruder and the like. More particularly, in the preferred embodiment the present invention is a complex multifunctional multilayered cleaning pad suitable for removing debris from the external extruder and neighboring volumes and hard surfaces on 3D printers, electronic and fluidic systems. The present invention thus has utility in many fields, the most relevant will be discussed: 3D printing. However, the present invention is also applicable to other filament flow, fuel flow, and other printing systems. This invention also relates generally to woven, nonwoven, pressed and amorphous, cleaning pads, and more particularly to cleaning pads with multiple layers.

BACKGROUND OF THE INVENTION

By way of background and to place reasonable limits on the size of this disclosure, the following references and articles may be used by way of background material and to supplement this specification.

OTHER PATENTS AND PUBLICATIONS

David E. H. Jones in column Ariadne in the magazine New Scientist (1974)
Gross, B.C. et alia, Analytical Chemistry 86, 3240 (2014)
V. Singh et al. "Novel natural sorbent for oil spill cleanup." Vol. 53, Industrial and Engineering Chemistry Research, Vol. 53, July 30, 2014, p. 11954. doi: 10.1021/ ie5019436
Abdelwahab O, et alia, Palm fiber absorbents for different oils, Alexandria Engineering Journal, Volume 56, Issue 4, December 2017, Pages 749-755, https://doi.org/10.1016/j.aej.2016.11.020\].
Gashti, M.P, et alia, chapter 13, surface and bulk modification of synthetic textiles to improve dyeability
https://www.intechopen.com/books/textile-dyeing/surface-and-bulk-modification-of-synthetic-textiles-to-improve-dyeability
Yeh, J-T, et al., J. Applied Polymer Sci 103, 1140-1145 (2007)
Yu, M et alia, Superhydrophobic cotton fabric coating based on a complex layer of silica nanoparticles and perfluorooctylated quaternary ammonium silane coupling agent *Applied Surface Science* 253(7):3669-3673 (2007)
Liu. J, Prep of durable superhydrophic surface, J. Sol-Gel Sci Tech, 58, 18-23 (2011)

3D printing involves solid objects, created from filaments which move through a heated extruder to deposit, layer by layer, beginning upon the build plate, and ending with the topmost layer of the printed object. It is a method for generating real objects from materials loaded into filaments, and melted to form the desired object layer by layer upon the build plate.

3D printing processes is used in industrial production, both professional and amateur and in educationally-oriented places such as schools and homes. It is also called "additive manufacturing", "material extrusion printing" and "fused deposition modeling" and the like. The idea of additive manufacturing was conceived in 1974 by David E. H. Jones in column Ariadne in the magazine New Scientist.

In 1993, the words "3D printing" appeared referring to a powder bed process invented at MIT by Emanuel Sachs. Most relevant here, 3D printing (creation or construction) of an object usually takes several hours to days.

Today, 3D printing is very important, and is being adopted rapidly on Earth, and in space. The 3D printing market is growing ~21 percent per year, now at 13.8 billion U.S. dollars (2019). The market for 3D printers is ~5.3 billion U.S. dollars. Even most automobile manufacturers now use it. Dental, medical, and aerospace industries are expected to make up more than half the market within ten years.

In a recent survey 98% of businesses using 3D printers replied that 3D printing gave them competitive advantages and faster product development. Interestingly, three quarters of the respondents reported that their competitors also have incorporated 3D printers into their work, design and production. Business and personal reasons for using 3D printing include using the 3D prints for production, prototyping, for "Proof of Concept" tests and models, as well as offering customized and build-to-order objects.

3D printing is a terrific opportunity for learning to also learn mathematics, three dimensional stereo-relationships, fluid mechanics, polymer science, and to be productive. Great things can be printed but problems exist for mathematical and physical reasons.

DEFICIENCY IN PRIOR TECHNOLOGY

Several types of problems exist; many not involving the present invention. Problems exist in the mathematical 3D model used by the fluid flow- and thermal-processes controlled by the 3D printer. These are STL files, and they can have errors of bad merging intersections, leaking holes, false noise objects, or surfaces, and more. Once repair is achieved for the errors, the STL files are processed by a slicer to a series of thin layers like a CAT scan. Each is coded in a binary or text G-code file with other instructions to the CD printer.

Another type has some overlap with the present invention. Physical reasons for 3D printing problems include problems in either, or both, the filament and the extruder. For example, unfortunately, nozzle damage is continuous and cannot be stopped. All nozzles deteriorate in time with changes internally and with irreversible changes at the orifice. The deterioration occurs faster with metal and carbon filled filaments.

A clean extruder nozzle, and volume outside it, is critical for maximizing the likelihood that a printer creates high quality prints. The extruder nozzle exterior surface will easily get covered with unwanted filament material, oils, and even sprays that are applied to the print-bed surface to increase adhesion to the print bed at the very beginning of the 3D print.

Wiping the external nozzle tip clean—before a print begins—is critical yet is simply not usually considered by many—in part because this problem is not anticipated ahead in time. Perfect 3D prints require clean extruder nozzle, and clear air-space around it. Even a simple hanging thread can damage a 3D print and will potentially cross-contaminate a different region with an unwanted color or material in a double or triple extruder 3D printer system.

Worse, the external extruder nozzle can easily, and quickly does, get covered with crud and clogged melted plastic even with initial flow checks, if it is not promptly and timely removed. Like the hanging filamental thread, crud on the surface increases the need for smoothing and post print fixes.

However, it is a fact that carefully wiping away debris maximizes the likelihood of keeping a 3D printer's nozzle clean, and that will help avoid inadvertent and unintentional contamination splashes, streaks, and strings.

It may also maximize the likelihood of keeping your 3D printer's nozzle lasting longer.

One of the major deficiencies of prior technology is that cleaning the nozzle, and the nearby area, of crud, and past filament, is not as easy as it seems. Cleaning the extruder nozzle can be quite difficult due to its small size, location and heat generation during printing. Most developments in the art of cleaning pads have been made to improve cleaning pads for removal of, and absorption of, liquids.

ADVANTAGES OF THE PRESENT INVENTION

The present invention is a significant improvement of previous technologies. Other objects and advantages of the present invention will become apparent from the following descriptions, taken in connection with the accompanying drawings, wherein, by way of illustration and example, an embodiment of this present invention is shown.

The following advantages are discussed without demeaning any of the others. The primary object of the invention is to minimize, and possibly avoid, wasted 3D prints, wasted materials and wasted time.

From a cleaner operational perspective, another object of the invention is to help clean the exterior surface of a 3D printer extruder nozzle and the surrounding volume.

Another object of the invention is to help clean the external surface of the extruder nozzle before a print, and after a flow check, to yield a superior 3D print.

Another object of the invention is to provide a sweeping filament-adherent surface to improve removal of external peri-extruder debris.

Still yet another object of the invention is to wipe away flowing extraneous filament.

From a strategic perspective of protecting the extruder and 3D printer, a further object of the invention is to remove oils, most types of unwanted deleterious post-extrusion filament debris, and materials used to improve binding to the print plate which inadvertently reach the extruder volume.

A further object of the invention is to provide an oil absorbing volume to remove hydrocarbons and other contaminants which may damage the extruder.

A further object of the invention is to possibly maximize the likelihood of keeping a 3D printer's nozzle lasting longer.

Yet another object of the invention is to protect the extruder from buildup of contaminant from user sprays applied to the print bed to increase adhesion.

From the view of improving 3D printed objects, still yet another object of the invention is to minimize or avoid hanging thread damage, and debris damage, to a 3D print.

Another object of the invention is to minimize or avoid cross-contaminate with a different region in a double or triple extruder 3D printer system.

Another object of the invention is to minimize or avoid the negative impact on a 3D print by unintentional pressure damage and contamination from splashes, streaks, and strings.

From the view of the user of 3D printers and like systems, yet another object of the invention is to make the important removal of contaminant debris easier before the next 3D print for a greater likelihood of more accurate, cleaner, better 3D print.

Another object of the invention is to enable examination of the captured removed debris, that did NOT accumulate on the precious 3D print, to better understand the filament material after it transits the heater and extruder.

Yet another object of the invention is to maximize the likelihood that the printer creates high quality prints.

Still yet another object of the invention is to maximize the likelihood of high quality 3D prints.

Another object of the invention is to provide an easy to use service system and tool for cleaning the external surface of the extruder nozzle.

Finally, but just as importantly, yet another object of the invention is to provide a thermal insulating layer to further protect the human hand sweeping clean the volume external to the extruder.

Therefore, another object of the invention is to enable a safer method of removing debris in the region of the extruder and neighboring volume.

Other objects and advantages of the present invention will become apparent from the following descriptions, taken in connection with the accompanying drawings, wherein, by way of illustration and example, an embodiment of the present invention is disclosed.

Regarding the present invention: it is important that this metallic volume-loss deterioration of the extruder must be distinguished from cleaning the surrounding extruder surface and volume. The latter, which the present invention has great utility in solving, may slowly diminish the rate of such extruder deterioration, but most importantly it also immediately and going forward improves the quality of actual 3D prints.

To repeat this: Cleaning by the present invention the surface and volume surrounding a 3D printer nozzle does not restore a damaged nozzle which has metal deterioration, as expected by 3D printer use. This invention and surface cleaning system will not restore any such nozzle breakdown and material loss, nor will it fix the other problems of 3D printing which must always be addressed in order to produce superior performance and printouts.

Those problems include nozzle clogging, over- and under-extrusion, infill issues, warping, pillowing, layer separation, stringing, overhangs, filament material and flow problems, and print-bed problems. These are discussed elsewhere such as:

Print Quality Troubleshooting Guide,
  https://www.simplify3d.com>support>print-quality-troubleshooting
3D Printer Troubleshooting Guide,
  https://www.matterhackers.com/articles/3d-printer-troubleshooting-guide
The Ultimate 3D Print Quality Troubleshooting Guide 2019, and https://rigid.ink/pages/ultimate-troubleshooting-guide
3D Printer Troubleshooting Guide.
https://www.matterhackers.com/articles/3d-printer-troubleshooting-guide

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged or out of proportion in an effort to facilitate an understanding of the invention.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Further details, advantages, and aspects of exemplary embodiments of the present disclosure are described in more detail below with reference to the appended figures.

Figure 1:
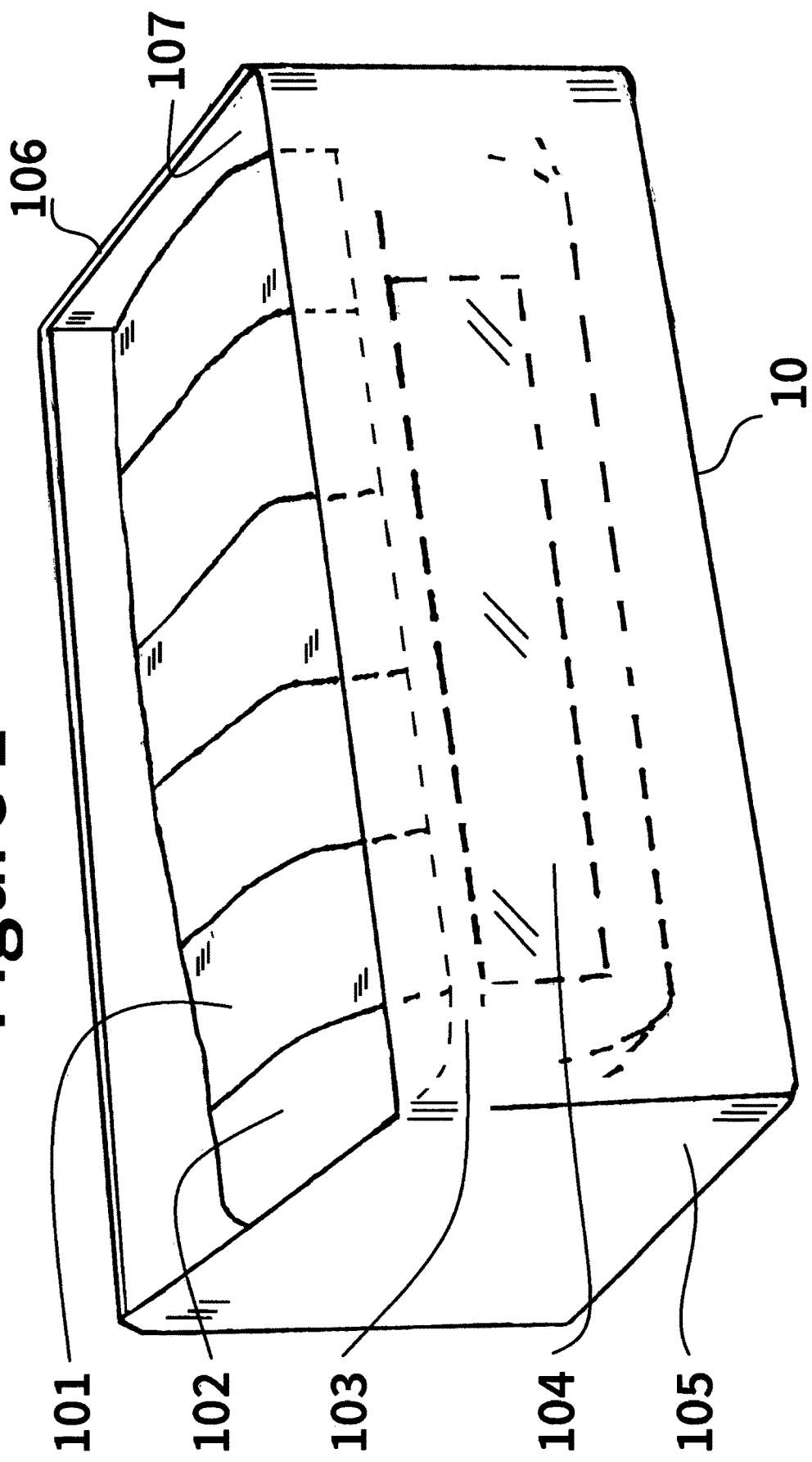

FIG. 1 shows the present invention, which although it is much more, appears as an extruder cleaning pad (ECP). It is shown partially in cutaway from the front point of view, and is a top perspective view of the exemplary cleaning pad, as taught herein.

Figure 2:
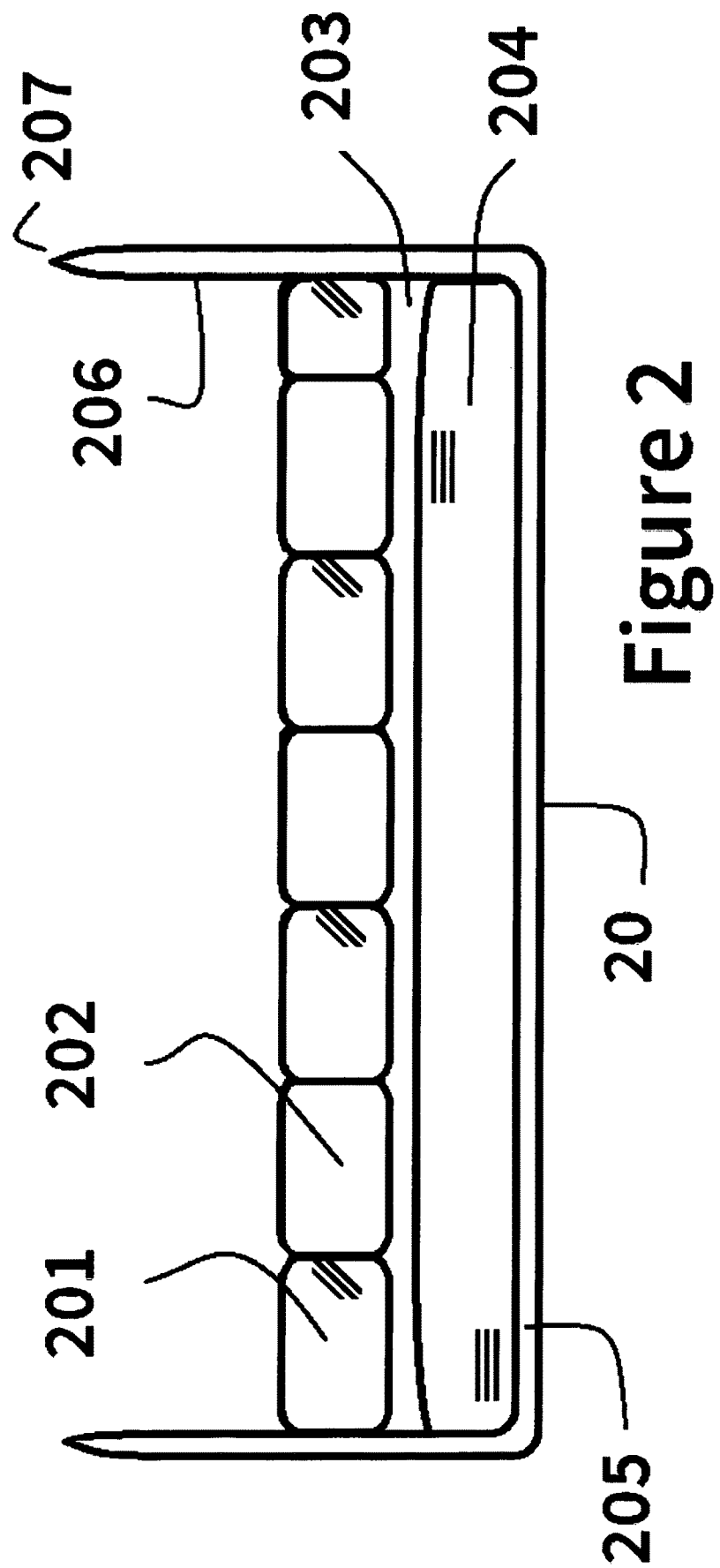

FIG. 2 is an image of another embodiment of the present invention, this time in a cross-sectional view.

DESCRIPTION OF PREFERRED EMBODIMENT

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, process, apparatus or manner.

One embodiment of the invention relates to a cleaning pad for cleaning the external surface of the extruder nozzle. It is an invention of great utility and is the right tool and service system which has been engineered and designed to remove the oils, fomites, dirt, and most types of unwanted deleterious post-extrusion filament and other debris from the metal 3D print extruder and the volume outside the extruder. Such prophylactic action will minimize, and avoid wasted 3D prints, wasted materials and wasted time.

Without demeaning any of its other features, it is a multiuse, disposable, high-traction filament-adherent removal square. It thus makes the important removal easier before the next and following 3D prints for a subsequent greater likelihood of more accurate, cleaner, better 3D prints.

Turning to the figures, FIG. 1 shows an image showing the preferred embodiment of this invention. The invention's functional components are therein shown by location and described in detail below.

The FIG. 1 shows a "pad" like system [labelled 10], with the components for human protection, and additional sweep cleaning, and edge-scraping. Examining the external cleaning pad [10] in more detail will now lead to discussions of the features in the present invention used to remove unwanted, unintentionally-deposited, material, and oils, and the additional components for human protection, and the additional component for sweep cleaning the extruder surface.

Referring to FIG. 1, the ECP [labeled 10], the present invention, is comprised of multiple features/materials/designs to provide for binding and removal of particles and debris, and storage and removal of oils and unwanted adhesive materials inadvertently deposited on the extruder when they are applied to the, often heated, build plate to increase adhesion, and to fine scraping of the target surface, and for more protection of the individual using the invention.

As can be seen in FIG. 1, the ECP described in the present invention for 3D printers includes a top layer, a second layer holding that material to the third layer for thermal protection, and a fourth layer on the bottom surface which comes up around the sides for scraping, as necessary.

The first layer has a top surface and a bottom surface. At the top surface, the external cleaning pad (ECP) contains at the most external (superior in the FIG. 1) surface at least one component that removes unwanted, unintentionally deposited, materials and oils. In the preferred embodiment there are at least two components on the upper surface, both a filament adherent region and a hydrophilic region joined together on the top surface of the first layer.

In the preferred embodiment, these two components are interwoven as fibers. The ECP thus has good absorbency for oily debris, and good removal capability for the post extruder filament.

In an alternate embodiment, the two materials on the upper surface of the first layer are made from non-woven material could be formed by hydro-entangling, spun-bonding, melt-blowing, thermal bonding, air bonding, needle-punching, or adhesive bonding.

Most importantly, on the upper surface of the first layer there is a unique filament binding (adherent) component [labelled 101] on the surface capable of seizing, binding, and then removing unwanted and providing samples of post-extruder filament material for examination. This begins by a combination of friction and adherence as the ECP is physically swept through the extruder external surface and volume, vicinal to the hole in the center.

It is also of great utility that this filament-adherent surface is also capable of removing tightly unwanted material and providing some of that as physical samples of post-extruder filament material for subsequent examination. Understanding of the processes, fluid flow, thermal issues, and other aspects can be better made by such examination.

To investigate the performance of a pad, CREATBOT 3D and Wanhao 3D printer were used to generate examinations of hanging filamental debris and other materials arising during extensive use from hot (190-290 degrees C.) heaters passing filament over thousands of hours. Removal techniques and materials were examined for use on and adjacent to the extruder.

After said extensive examinations, in the preferred embodiment, the filament binding (adherent) component on the upper surface of the top layer, for the majority of filament materials used, is cotton fiber. That material captured more than 95% of the post extruder filaments in a single sweep, with their contents remaining firmly attached for additional investigations. Absorbency was measured by the continued adhesion of the "grabbed" filament by the pad being examined for effectiveness and utility.

When positioned correctly, some filaments such as PLA easily stick to this material tightly, enabling it to be effectively active for multiuse disposable high-traction filament-adherent pads; squares, or other usable shapes and configurations. The following brief review will explain more.

Cotton is a soft, natural hollow fiber arising in a boll around the surface of seeds of the cotton plant (genus of *Gossypium*). There are about six or seven seeds in a boll and about 20,000 cotton fibers attached to each seed. The chemical composition of cotton fiber is 90-95% cellulose [poly-1,4-d-glucopyranose], 4-6% water and waxes, pectins, fats, organic acids and inorganic substances. The cellulose provides cotton its strength, durability, and ability to withstand abrasion wear. Cotton fiber is 70 to 80% crystalline and partly amorphous. Cotton fibers are hollow with concentric layers and grow in single flat plant cells which elongated and become twisted [~60 twists ['convolutions] per centimeter]. The outer surface has a protective wax-like coating which is also adhesive. The outer cell wall has a cuticle of wax and pectin. In the preferred embodiment it is is prewashed and made pH neutral.

In some alternate embodiments, the upper debris-removing filament adhesive surface may be a textile, or microfiber and additional adhesive material may be present, including a pressure-sensitive adhesive or very low temperature thermoplastic.

In the preferred embodiment, the texture outwardly facing surface plays a slightly lesser role in debris removal compared to the adhesion of the post-extruder filament for the surface. However, in some cases, this can be reversed. As needed, the upper surface may also be augmented by further structures such as hook, or partial loop attachments, to increase the grabbing-power of the ECP for filaments of materials which need further adhesive-power from the pad. In the preferred embodiment, such additional hooks for removing debris are polyethylene, polypropylene, or nylon.

In addition, on the top surface of the first layer, there is an oil absorbing surface with a large oil absorbing volume below it. This surface feature is shown in FIG. 1 [labelled 102]. It is capable of removing, and then storing for disposal elsewhere, and oil or other similar fluid or contained materials which might be, including unintentionally and/or inadvertently, on the external extruder surface.

The oil collecting adherent substance is a member of the group consisting of low-grade cotton, cotton treated with ozone gas and fluorocarbon monomer, superhydrophobic cotton fibers, polyester, polypropylene, nylon, Kevlar, 80/20 polyester/nylon, 80% polyester, 20% polyamide, 80/20 polyester/nylon, or other high oil-absorbance materials, In the preferred embodiment the oil binding sorbents which are fibers using high technology super oil absorbent materials. In the preferred embodiment, low-grade cotton is used as the sorbent of oil, to absorb and remove with the ECP the unwanted inadvertently present oil. Such low-micronaire cotton, one of the lowest-quality types of cotton, is the most effective at sequestering oil; 30 to almost 50 times its weight. This is much higher than the absorption uptake by most oil based plastics [V. Singh et al. "Novel natural sorbent for oil spill cleanup." Vol. 53, Industrial and Engineering Chemistry Research, Vol. 53, Jul. 30, 2014, p. 11954. doi: 10.1021/ie5019436]. This type of cotton is a terrific sorbent for oil because of three processes.

By adsorption oil clings to the surface of the cotton fibers and the upper surface of the first layer of the present invention. The specially treated fibers also absorb oil, transferring it from the peri-extruder space to the ECP. Also, cotton fills with oil by channels between its fibers through capillary action.

As an alternative to modified cotton, palm fibers (*Phoenix dactylifera* or date palms in the palm family Arecaceae) and modified palm fibers can be used as good adsorbents for different oils [Alexandria Engineering Journal, Volume 56, Issue 4, December 2017, Pages 749-755, Abdelwahab https://doi.org/10.1016/j.aej.2016.11.020\].

In yet another embodiment, abaca can be used. It has greater mechanical strength. In another embodiment, coir can be used. It is an even stronger vegetable fiber from the outer shell of coconuts.

In another embodiment, flax can be used. It is also strong, which has a more crystalline structure with more stiffness, often used as linen from the stems of the flax plants.

Other treated types of cotton that can be used include those that improve hydrophobicity. There are many techniques to do this.

Gashti used ozone gas and fluorocarbon monomer to make cotton fibers with even more increased hydrophobicity.

Yu used silica nanoparticles and perfluorooctylated quaternary ammonium silane coupling agent obtain superhydrophobic cotton fibers.

Yeh used silica nanoparticles and fluorocarbon. Liu used sol gels and citric acid. Jayasubramanyan is reported to have made "superhydrophobic" cotton fibers by applying a coating of polyvinyl chloride, copper stearate, and Fe2O3 or Cr2O3 nanoparticles.

In another embodiment, the oil binding component can be hydrophobic synthetic fibers produced from oil-based products, then heated for flow through a small hole to make usually a continuous monofilament fiber or nonwoven fabric. Those preferred materials are are polyester, polypropylene, nylon, and Kevlar. These are stronger than cotton fibers and can be interwoven, or made into a composite with cotton. The weakness is that they are thermoplastic and their stiffness will fail below a critical temperature, and burn and melt.

Beneath the first layer, the second and third layers constitute the core. The second layer has an upper surface binding the first layer, and the floor surface which binds to the layer below it, which is the thermal insulating layer.

The top surface of the second layer may have an adhesive material for adhering to the first layer, and an adhesive material on the bottom surface for adhering to the thermal insulating, third, layer. The adhesive layer could also be fibers constructed from polypropylene, polyethylene, polyethylene terephthalate (PET) or cyanoacrylate.

The second layer has a top surface adherent to the first layer, and a bottom surface and which is well attached, both structurally and thermally, to the thermal insulating layer. In the preferred embodiment, the second layer is a supporting, and composite material [labelled 103] which gives stiffness to the invention and which improves the inventions' structural strength. The second layer ma be a cowoven material for improving structural strength or may be composed of the same material in the region labelled 101.

In an alternate embodiment, this layer includes a cowoven material, making it an in situ method for improving structural strength.

Beneath the bottom surface of the second layer, is heat obstructing ["insulating"] material. Referring to the figures, FIG. 1 also shows the thermal insulating layer [labelled 104] which is located underneath the surface debris-removing layer, to further protect the hand of the person cleaning the external extruder volume. The R-value discussed below measure the thermal resistance of a material. The R-value is measured per inch of thickness for comparison reasons.

In the preferred embodiment, the thermal protecting layer is a member of the group consisting of cotton, cellulose, boron nitride, fiberglass, mineral wool, polyurethane, polystyrene, Aerogel, and Pyrogel.

For general purpose use, cotton and cellulose remain the preferred embodiment for the third layer of the present invention. Cellulose is a linear polymer of 1,4-β-D-glucose units which is fire resistant and eco-friendly. It is usually made from recycled cardboard and paper, and has an R-value between R-3.1 and R-3.7.

However, for very large commercial 3D printers, fiberglass and mineral wool could be considered. Fiberglass is made with multiple strands of glass weaved to minimize the transfer of heat across it. Its R-value is between 2.9 and 3.8 per inch of insulation. However, fiberglass requires careful handling and can be extremely damaging to lungs, skin, and eyes. Mineral wool is effective, but not fire resistant.

Also for some very few and special 3D printers, as in space, the thermal insulating material could be aerogel, which is normally too expensive. Aerogel is the best thermal insulator and can survive to 2000 degrees Fahrenheit. It is made from silica by supercritical drying. Aerogel is the highest R-value-per-inch insulation available; an R-value of 10.3 per inch. Pyrogel XT is another efficient industrial insulation.

There are other materials which could be used such as polystyrene and polyurethane but they have safety and environmental issues. Closed-cell polyurethane very combustible and has an R-value of approximately R-6.3, and is fire resistant. Polystyrene (styrofoam) is a thermoplastic foam with an R-value of up to R-5.5. However, because the foam is also flammable it needs fireproofing. Hexabromocyclododecane (HBCD) is used but also has health and environmental risks.

With attention directed back to FIG. 1, in addition, binding the entire invention together, there is present a surrounding material, the fourth layer [labelled 105 in FIG. 1]. This is designed to partially protrude from the most superior surface, as a perimeter edge modification. This is important for hermetic seal, for full likelihood of removal, and to improve removal of debris, long-term handling and storage life.

Most importantly, this fourth layer, the seal formed between the exterior portion of invention, from the bottom surface to the top surface of the first layer may be hermetic. By having the bottom surface (fourth layer) sealed into the top portion of the first layer, the entire packet (or pad) becomes peripherally joined, as is known in the art. This arrangement creates a secure holding pocket for the top superior surface and the core.

As importantly, the perimeter edge modification of the fourth layer is used to improve removal of debris. Referring to FIG. 1, this is accomplished by a depression and wall [labelled 106], and hard sharp elevated peripheral area [labelled 107]. The depression is the large debris-capturing surface, and the wall is the perimeter edge modification, or weave, itself. In the preferred embodiment, the superior surface's surrounding edge modification from the fourth layer is about 1 millimeter in height.

A suitable material for the fourth layer could be thermoset plastic, or apertured nonwoven or woven fabric.

In an alternative embodiment, batting is used to enhance, augment, or replace the debris-capturing surface.

Referring now to FIG. 2. FIG. 2 is an image of this embodiment of the present invention in a cross-sectional view. The invention's functional components are therein shown by location and described in detail above and below.

FIG. 2 shows the "pad" like system [labelled 20] with some of the components for human protection and additional sweep cleaning the extruder surface and edge-scraping saliently shown including those features to remove material, and oils.

Referring to FIG. 2, the ECP [labeled 20] includes a top layer, a second layer holding that material to the third layer for thermal protection, and a fourth layer on the bottom surface which comes up around the sides for scraping. The first layer has a top surface which contains at least one component that removes unwanted, unintentionally deposited, materials and oils. In the preferred embodiment there are at least two components on the upper surface, as shown in this figure in alternating regions [labelled 201 and 202]. These are the filament-adherent region and the hydrophilic region, here joined together in alternating fashion on the top surface of the first layer.

Beneath the first layer, are the second and third layers which constitute the core. The second layer [labelled 203] has an upper surface binding the first layer, and the floor surface which binds to the layer below it, which is the thermal insulating layer [labelled 204]. The thermal insulating layer [labelled 204] is to further protect the hand of the person cleaning the external extruder volume.

As shown in FIG. 2, the entire invention is held together by a surrounding material, the fourth layer [labelled 205]. This is designed to partially protrude from the most superior surface, as a perimeter edge modification [labelled 206 and 207 in FIG. 2] to improve removal of debris. The perimeter edge modification of the fourth layer is accomplished by a depression and wall.

The following is the preferred embodiment of use: the user should take the present invention, and wipe gently, quickly avoiding any prolonged contact with any and all hot surfaces. The multiuse disposable high traction filament-adherent ECP squares will bind to and then sweep away flowing extraneous filament from the surface, and from the nearby volume, of the extruder nozzle, as it removes the unwanted deleterious post-extrusion filament debris. This is of incredible utility. The stringing is removed with using pliers or having burnt fingers. The area is clear and protected unlike any other way.

Also of great utility, the sweep and capture also enables the operator or user to look at the captured removed debris that did NOT accumulate on their important precious 3D print.

In the preferred embodiment, the materials comprising this invention are biodegradable, abrasive, and flexible composite materials that are safe for both operator and machine.

They are designed to work in all 3-D printers to keep the critical extruder head, outer orifice, and surrounding surface cleaner. They are specially designed by 3D prints and PLA, and they work with most other filaments, as well.

In some embodiments, the cleaning pad may be sized and dimensioned to be applied to a variety of 3D printers, such as used to build a house or car.

In the preferred embodiment, the ECP has a length and width of about 2 to 3 inches, and a thickness of between about 1 mm and about 3 mm.

In the preferred embodiment, the ECP is square. However, it could be rectangular, triangular, round, star-shaped, and so forth.

In one embodiment, the bottom surface could also contain a display of an electronic device to report monitoring and/or to helping further cleaning (for example by scouring by reflected light or sound on the presence of additional material, or the measurement of material. The output could also be by a color signal. This could relay information about extruder temperature, and gases and the like, in that volume.

Monitoring the extruder and surrounding volume for temperature can also be reassuring to the user, and can protect the 3D printer for temperature extremes and protect the user from unwanted exposures of fumes without odors through early, timely notification.

In one embodiment, the ECP can be used by either hand or with an extension cleaning implement which is capable of holding the ECP with an elongate handle and connector to hold the ECP. In that embodiment, the elongate handle is metal, plastic, or wood, either tubular or a solid rod.

Furthermore, an optional back sheet and brace may be used to make the ECP part of an external extension for human or robotic use.

Alternative exemplary embodiments relate to other features and combinations of features as may be generally recited in the claims. The Figures illustrate the exemplary embodiments in detail, and it should be understood that the present application is not limited to the details or methodology set forth in the description or illustrated in the Figures. It should also be understood that the terminology is for the purpose of description only and should not be regarded as limiting.

Further modifications and alternative embodiments of various aspects of the invention will be apparent to those skilled in the art in view of this description. Application to different extruder types, different 3D printers, and other types of object-making systems. It is also applicable for biomedical and engineering use where contamination and debris are issues.

Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings of the subject matter described herein. Other substitutions, modifications, changes and omissions may also be made in the design, operating conditions and arrangement of the various exemplary embodiments without departing from the scope of the present invention.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

For purposes of this disclosure, "coupled" means the mechanical joining of two components directly or indirectly to one another. Such joining may be stationary in nature or moveable in nature. Such joining may be achieved with the two components and any additional intermediate members being integrally formed as a single unitary body with one another or the two components and any additional member being attached to one another. Such joining may be permanent in nature or alternatively be removable or releasable in nature.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed:

1. A cleaning pad for the external surface of a 3D printer's extruder to remove filaments, with said cleaning pad having four different layers comprising:
    a first layer, having a top surface and a bottom surface, wherein the top surface includes a filament-adherent surface area capable of removing unwanted material from the external extruder surface and an oil absorbing area, including an oil absorbing material capable of removing hydrophobic oils and fluids, the areas joined together in an alternating fashion on the top surface of the first layer
    a second layer having a top surface and a bottom surface, wherein the top surface contacts and adheres to said bottom surface of said first layer and wherein the bottom surface of said second layer binds structurally and contacts thermally to a third layer which is a thermal insulating layer to minimize heat transfer; and
    a fourth layer having a top surface and a bottom surface, wherein the top surface is adherent to the bottom surface of the third layer and an extension of the bottom surface is adherent to the first layer and the second layer around the entire perimeter of the cleaning pad.

2. The cleaning pad as in claim 1 wherein the fourth layer has a perimeter sealing surface consisting of an elevated edge part which extends outward beyond said top surface of said first layer to improve removal of debris.

3. The cleaning pad as in claim 1, wherein an optical stage is included with the cleaning pad to examine the removed samples of post-extruder filament and other material.

4. The cleaning pad as in claim 1, wherein said second layer provides structural strengthening by use of a composite material.

5. The cleaning pad as in claim 1, wherein the first layer is made from a non-woven material formed by hydro-entangling, spun-bonding, melt-blowing, thermal bonding, air bonding, needle-punching, or adhesive bonding technique.

6. The cleaning pad as in claim 1, wherein said filament-adherent surface area contains cotton fiber.

7. The cleaning pad as in claim 1, wherein said filament-adherent surface of said first layer includes a member of the group consisting of debris-removing adhesive surface area, microfiber adhesive material, pressure-sensitive adhesive, thermoplastic, or physical hooks of polyethylene, polypropylene, or nylon.

8. The cleaning pad as in claim 1 wherein said oil absorbing material is a member of the group consisting of low-grade cotton, cotton treated with ozone gas and fluorocarbon monomer, superhydrophobic cotton fibers, polyester, polypropylene, nylon, Kevlar, 80%/20%/polyester/nylon, 80% polyester, 20% polyamide.

9. The cleaning pad as in claim 1, wherein the bottom surface of the second layer has at least one adhesive selected from the group consisting of polypropylene, polyethylene, polyethylene terephthalate (PET), and cyanoacrylate.

10. The cleaning pad as in claim 1, wherein said third layer includes at least one material selected from the group consisting of cotton, cellulose, fiberglass, mineral wool, polyurethane, polystyrene, Aerogel, and Pyrogel as a heat insulating material.

11. The cleaning pad as in claim 2, where said elevated edge part is about 1 millimeter in height.

12. The cleaning pad as in claim 1, wherein the fourth layer is selected from the group consisting of thermoset plastic, an apertured nonwoven and a woven fabric.

13. The cleaning pad as in claim 1, the cleaning pad having a length and a width of about 2 to 3 inches, and a thickness of between about 1 mm and about 3 mm.

14. The cleaning pad as in claim 1, wherein said bottom surface of the fourth layer includes a functional display which is selected from the group consisting of electronic monitoring devices, electronic temperature indicators, and color signal temperature indicators.

15. The cleaning pad as in claim 1, further including an extender so that it can be used either in hand or with an extension cleaning implement having an elongate handle and connector.

16. The cleaning pad as in claim 1, including an additional fifth layer acting as a back sheet brace for improving contact and stability for human or robotic use.

17. An article of manufacture for cleaning an external surface of a 3D printer's extruder and removing filaments, said article having four different layers comprising:
 a filament adherent surface area capable of removing unwanted material and providing samples of post-extruder filament material for examination;
 an oil absorbing area comprising material capable of removing and storing oils and other fluids from the external surface of the extruder, the areas joined together in an alternating fashion;
 a thermal insulating layer to further protect the hand of the person cleaning said external surface of the extruder; and;
 a perimeter edge or weave part for improving at least one of removal of debris, improved handling and storage life.

18. A cleaning pad for the removal of filaments from an extruder of a 3D printer comprising four different layers, including:
 a first layer, having a top surface and a bottom surface, wherein the top surface includes a filament-adherent surface area and an oil absorbing surface area comprising material capable of removing hydrophobic oils and fluids, the areas joined together in an alternating fashion at the top surface of the first layer;
 a second layer bound both structurally and thermally to the first layer and a third layer;
 said third layer being a thermal insulating layer; and
 a fourth layer having a top and bottom surfaces, wherein the top surface is adherent and seals to the bottom surface of the third layer and also seals the other components of the cleaning pad around the entire perimeter of said cleaning pad.

19. The cleaning pad as in claim 18 wherein the pad includes an edge modification along the upper perimeter the edge modification having has a height from about 0.5 mm to about 1 mm, a length and a width from about 2 inches to about 3 inches, and a thickness of between about 1 mm to about 3 mm.

* * * * *